United States Patent [19]
Goncalves

[11] Patent Number: 5,092,949
[45] Date of Patent: Mar. 3, 1992

[54] METHOD OF MAKING LAMINATED, THERMALLY IMAGEABLE TAG, SUCH AS BAGGAGE TAG

[75] Inventor: Eric Goncalves, Nashville, Tenn.

[73] Assignee: Rand McNally & Company, Skokie, Ill.

[21] Appl. No.: 456,323

[22] Filed: Dec. 26, 1989

[51] Int. Cl.⁵ .............................................. B29C 31/08
[52] U.S. Cl. .............................. 156/179; 156/244.11; 156/282
[58] Field of Search ............ 156/179, 282, 311, 244.11

[56] References Cited

U.S. PATENT DOCUMENTS

| | | | |
|---|---|---|---|
| 1,291,709 | 1/1919 | Angier | 156/179 |
| 4,610,745 | 9/1986 | Sallee et al. | 156/244.11 |
| 4,630,384 | 12/1986 | Breen | 24/16 PB |
| 4,817,310 | 4/1989 | Breen et al. | 40/299 |

Primary Examiner—Michael W. Ball
Assistant Examiner—Steven D. Maki
Attorney, Agent, or Firm—Dressler, Goldsmith, Shore, Sutker & Milnamow, Ltd.

[57] ABSTRACT

A method of making a laminated, thermally imageable tag, such as a baggage tag, as made from a top sheet. The top sheet is precoated on one surface with a thermally sensitive material. A hot-melt adhesive is applied to the bottom sheet. The top sheet, the reinforcing fibers, and the bottom sheet are pressed together, as by two pressing rolls defining a nip. A laminate thus is formed with the reinforcing fibers between the top and bottom sheets. The hot-melt adhesive is applied and the top sheet, the reinforcing fibers, and the bottom sheet are pressed together under conditions insuring that the thermally sensitive material is not heated to its activation temperature by heat transfer from the hot-melt adhesive, through the top sheet, to the thermally sensitive material.

14 Claims, 1 Drawing Sheet

METHOD OF MAKING LAMINATED, THERMALLY IMAGEABLE TAG, SUCH AS BAGGAGE TAG

TECHNICAL FIELD OF THE INVENTION

This invention pertains to a method of making a laminated, thermally imageable tag, such as a baggage tag, which may be predominantly paper.

BACKGROUND OF THE INVENTION

Baggage tags are used daily in countless numbers by airlines, railroads, and others. In recent years, disposable, thermally imprintable, baggage tags have entered into widespread use. Most have employed materials other than paper as the predominant material from which they are fabricated.

Recently, disposable, thermally imageable, tags, predominantly of paper, have been suggested and one such is disclosed in Breen et al. U.S. Pat. No. 4,817,310. A baggage tag of related interest is disclosed in Breen U.S. Pat. No. 4,630,384.

The baggage tag disclosed in the Breen et al. patent noted above is made from a laminate including a top sheet and a bottom sheet with reinforcing fibers disposed between the top and bottom sheets. In forming such a laminate, it is known to use a hot-melt adhesive to unite the top sheet, the reinforcing fibers, and the bottom sheet. Moreover, it is known to press the laminate in a nip defined by a steel-surfaced pressing roll engaging the top sheet and a rubber-surfaced pressing roll engaging the bottom sheet.

In the Breen et al. patent noted above, it is disclosed that after the laminate has been formed, one surface of the top sheet is coated with a thermally sensitive material facilitating thermal imaging of data on the coated surface.

There has been a need, to which this invention is addressed, for an improved method of making a laminated, thermally imageable tag, such as a baggage tag, which may be predominantly of paper.

SUMMARY OF THE INVENTION

This invention provides an improved method of making a laminated, thermally imageable tag, such as a baggage tag, which may be predominantly fabricated from paper. Broadly, the improved method contemplates making such a tag by laminating a top sheet, a plurality of reinforcing fibers, and a bottom sheet.

As provided, the top sheet is precoated on a first surface with a thermally sensitive material. Characteristically, a thermally sensitive material begins to darken when heated to a temperature that is known as its activation temperature.

The improved method contemplates applying a hot-melt adhesive to a selected one of the top and bottom sheets so that the precoated surface remains free of the hot-melt adhesive, preferably to the bottom sheet, and pressing the to sheet, the reinforcing fibers, and the bottom sheet together while the hot-melt adhesive remains capable of bonding. The top sheet, the reinforcing fibers, and the bottom sheet are pressed together such that the precoated surface of the top sheet remains exposed and free of the hot-melt adhesive and such that the hot-melt adhesive is caused to contact the remaining one of the top and bottom sheets. Thus, a laminate is formed from the top sheet, the reinforcing fibers, and the bottom sheet with the reinforcing fibers between the top and bottom sheets.

It is a significant feature of the improved method that the steps noted in the preceding paragraph are practiced under conditions insuring that the temperature of the hot-melt adhesive contacting the top sheet is sufficiently low to avoid heating the thermally sensitive material to the activation temperature. Such conditions are achievable even if the hot-melt adhesive remains at a temperature above the activation temperature when the top sheet, the reinforcing fibers, and the bottom sheet are pressed together, whereupon there is heat transfer from the hot-melt adhesive, through the top sheet, to the thermally sensitive material.

In a preferred example, the top sheet is made from 20-pound bond or like material, and the bottom sheet is made from kraft paper or like material and is softer and less dense than the top sheet. A thermally sensitive material is used which has an activation temperature in a range from about 145° F. to about 150° F. A hot-melt adhesive, such as amorphous polypropylene, is used which remains capable of bonding at a temperature in a range from about 185° F. to about 195° F. If the hot-melt adhesive consists essentially of amorphous polypropylene, it is applied at a temperature in a range from about 375° F. to about 380° F. The top sheet, the reinforcing fibers, and the bottom sheet are pressed together while the hot-melt adhesive remains at a temperature in the range from about 185° F. to about 195° F. The temperature of the hot-melt adhesive contacting the top sheet is sufficiently low to avoid heating the thermally sensitive material on the first surface of the top sheet to the activation temperature.

Optionally, the precoated surface of the top sheet may be chilled prior to applying the hot-melt to the bottom sheet. Thus, it is possible to use a hot-melt adhesive that remains at a higher temperature when the top sheet, the reinforcing fibers, and the bottom sheet are pressed together. A chilling roll engaging the precoated surface while the top sheet is fed lengthwise may be used to chill such surface.

Preferably, the top sheet, the reinforcing fibers, and the bottom sheet are of indeterminate length and are fed lengthwise. The improved method may be thus practiced on a continuous line. The laminate formed from the top sheet, the reinforcing fibers, and the bottom sheet may be then be combined, if desired, with other materials and may be perforated or otherwise operated on and then severed into suitably sized individual tags.

Preferably, the top sheet, the reinforcing fibers, and the bottom sheet are pressed together, as mentioned above, by means of two pressing rolls defining a nip, through which the top sheet, the reinforcing fibers, and the bottom sheet are fed lengthwise so as to form the laminate.

Preferably, the pressing rolls include a relatively hard roll engaging the top sheet and a relatively soft roll engaging the bottom sheet. Thus, such fibers tend to impress the bottom sheet, not the top sheet, so as to minimize deformation of the precoated surface.

These and other objects, features, and advantages of this invention are evident from the following description of a preferred mode for carrying out this invention, with reference to the accompanying drawings.

DETAILED DESCRIPTION OF PREFERRED MODE

Figure 1:
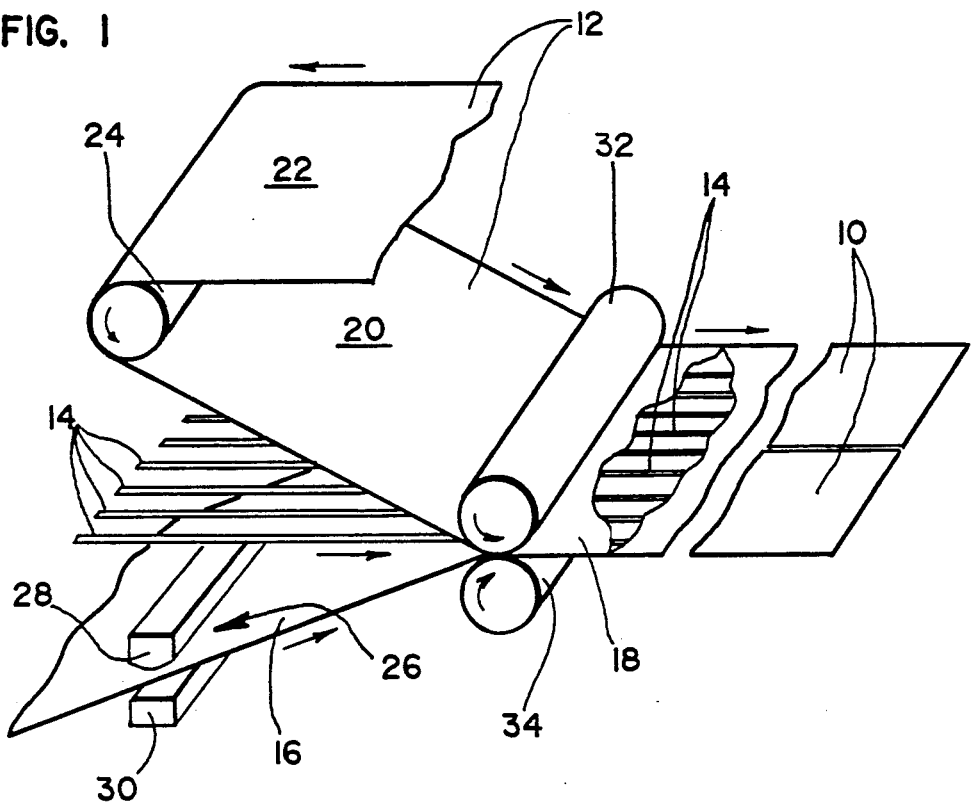
FIG. 1 is a schematic representation of a continuous line whereon laminated, thermally imageable tags, such as baggage tags, are being made by an improved method according to this invention.
Figure 2:
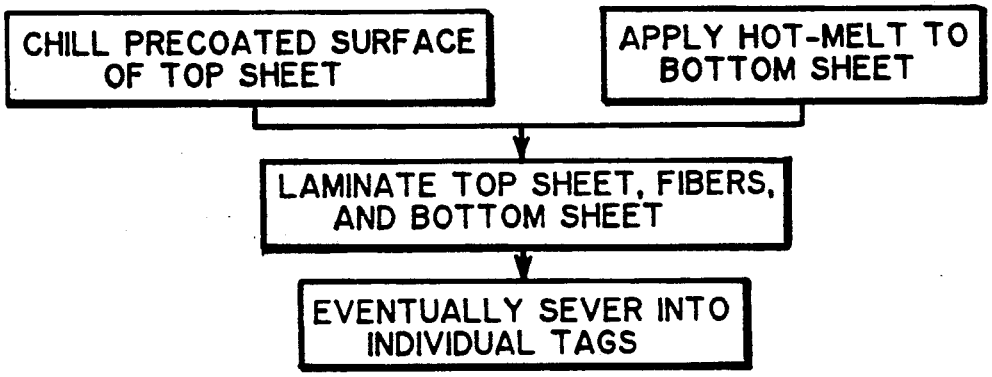
FIG. 2 is a flow diagram of certain steps in the improved method represented in FIG. 1.

In a preferred mode for carrying out this invention, a plurality of laminated, thermally imageable tags 10, which are useful as baggage tags, are made in a manner represented in FIGS. 1 and 2. Two individual tags 10 eventually formed from the laminate produced in accordance with this invention are shown. This invention enables such tags 10 to be mass-produced, in a continuous manner.

The tags 10 are made from a top sheet 12 of indeterminate length, a plurality of reinforcing fibers 14 of indeterminate length, and a bottom sheet 16 of indeterminate length. A laminate 18, which is severed into the individual tags 10, is formed from the top sheet 12, the reinforcing fibers 14, and the bottom sheet 16.

Preferably, the top sheet 12, which has an first surface 20 and a second surface 22, is made from highly calendared, dense bond paper, such as the presently preferred 20 pound bond paper, which resists wrinkling. As an example, James Riverx TM 20 pound bond paper available commercially from James River Corporation, Richmond, Virginia, is suitable.

As provided, the top sheet 12 is precoated on its first surface 20 with a thermally sensitive material, which facilitates thermal imaging of data on the coated surface 20. A suitable material for precoating such surface 20 is Appleton's Thermal Coating No. T1022A available commercially from Appleton Paper Company, Appleton, Wis. Appleton's Thermal Coating No. T1022A has an activation temperature of about 148° F. Other thermally sensitive materials are known and may be alternatively used to precoat such surface 20. Such surface 20 may be overprinted, at an appropriate time, with data of a constant nature.

So-called facsimile paper of a similar weight, if precoated on one surface with a thermally sensitive material, may be alternatively used for the top sheet 12 with the precoated surface 20.

It is important that the top sheet 12 be precoated. Precoating provides a high degree of uniformity, as compared to coating after the overall tag stock, including fibers, has been fabricated. Of course, it also permits the use of less coating material because coating over irregularities resulting from the fabrication process is avoided. As such, by precoating the top sheet stock, reduced cost and improved imaging characteristics result.

Preferably, the reinforcing fibers 14 are multistrand glass fibers, which are spaced equidistantly or variably within a range of about 0.125 inch to about 1 inch. Although glass fibers, such as multistrand glass fibers, are currently preferred, other fibers of single-strand glass, rayon, nylon or other polymeric materials may be used to the extent that they have sufficient reinforcing strength in the longitudinal direction. Fibers 14 may extend longitudinally, or longitudinally and cross-wise, or longitudinally and in a diagonal or diamond pattern, or in other patterns and spacings including longitudinally extending fibers.

Preferably, the bottom sheet 16 is a sheet of relatively soft paper, such as a kraft paper, which is also relatively inexpensive. A degree of softness is important in providing the greatest possible smoothness at the surface of the top sheet in the assembled fabricated bagagge tag. Thus, the softer, less dense bottom sheet will tend to accept the crush of the fibers during fabrication, in preference to the denser, harder top sheet.

In FIG. 1, the topsheet 12 is shown as being fed around a roll 24, which engages the precoated surface 20. Optionally, the roll 24 may be internally chilled, as by chilled water (not shown) flowing through the roll, so as to chill the precoated surface 20 to a temperature below the ambient temperature. It is not necessary, however, to chill the precoated surface 20 by means of the roll 24 if the temperature of the adhesive to be applied is insufficient to raise the temperature of the thermally sensitive material on the first surface of the top sheet 12 to its activation temperature.

An adhesive applicator 26, which may include an upper extruder 28 and a lower reservoir 30, is used to apply a hot-melt adhesive in a molten condition to the bottom sheet 16. Next, the top sheet 12, the reinforcing fibers 14, and the bottom sheet 16 are pressed together, while the hot-melt adhesive remains capable of bonding.

When the hot-melt adhesive contacts the second surface 22 of the top sheet 12, the hot-melt adhesive tends to heat up the top sheet 12 including the precoated surface 20. However, the hot-melt adhesive is applied and the top sheet 12, the reinforcing fibers, and the bottom sheet 16 are pressed together under conditions insuring that the temperature of the hot-melt adhesive effectively acting on the top sheet 12 is sufficiently low to avoid heating the thermally sensitive material on the precoated surface 20 to the activation temperature.

These conditions depend upon the types and quantities of materials used for the top sheet 12, for the thermally sensitive material precoating such surface 20, and for the hot-melt adhesive applied to the bottom sheet 16. These conditions also depend upon the temperature at which the hot-melt adhesive is applied, the ambient temperature, and the time passing between application of the hot-melt adhesive to the bottom sheet 16 and contact of the hot-melt adhesive with the top sheet 12. These conditions can be readily determined by a person skilled in the art.

If the hot-melt adhesive is pressure-sensitive, it remains capable of bonding indefinitely. Otherwise, the hot-melt adhesive remains capable of bonding within its so-called open-time, which depends upon its composition. See Cagle, *Handbook of Adhesive Bonding*, McGraw-Hill, New York (1973) at chapter 8, "Hot-melt Adhesives".

As shown, the top sheet 12, the reinforcing fibers 14, and the bottom sheet 16 are pressed together by means of two pressing rolls. The pressing rolls define a nip, through which the top sheet 12, the reinforcing fibers 14, and the bottom sheet 16 are fed lengthwise. The pressing rolls include a steel-surfaced pressing roll 32 engaging the top sheet 12, and a rubber-surfaced pressing roll 34 engaging the bottom sheet 16. The pressing roll 34 is surfaced with a suitable natural or synthetic rubber material.

Because the steel-surfaced pressing roll 40 is relatively hard and the rubber-surfaced pressing roll 42 is relatively soft, the reinforcing fibers 14 tend to impress the softer, less dense bottom sheet 16, not the top sheet 12. Thus, the precoated surface 20 tends to emerge from the nip in a substantially smooth condition, which is highly desirable for thermal imaging.

Not only is the top sheet surface smooth and more uniform when tags are made in accordance with this invention, but the tags are more compatible with dispensing machines and the tags produce clearer and more consistent images for effective machine reading. Thus bar codes, for example, are clearly imaged, and misreading of thermally imaged tags is minimized.

As shown, the laminate 18 emerges from the nip defined by the pressing rolls 32, 34. This base stock laminate may be combined, in a known manner in other operations, which may be in-line or which may be in other locations, with adjuncts such as liner paper, and adhesive to secure adjuncts. This will usually be followed in-line with whatever tooling operations are necessary, such as butt-cutting, perforating, and the like, followed by severing the so-treated laminate lengthwise and cross-wise into the final individual baggage tags 10, as illustrated by FIGS. 1 and 2. The additional combining and treatment, of course, may alternatively take place after the laminate has been severed, although that will not manually be the option of choice.

In a preferred example of carrying out this invention, the top sheet 12 is made from James River TM 20 pound bond paper, as precoated on the first surface 20 with Appleton's Thermal Coating No. T1022A in a thickness of about 0.2 mil, and is fed lengthwise at a rate of about 275 feet per minute. The reinforcing fibers 14, which are multistrand glass fibers, and the bottom sheet 16, which is made from kraft paper, are fed lengthwise at similar rates. The hot-melt adhesive consists essentially of amorphous polypropylene, which is applied to the bottom sheet in a thickness of about 3 mil, at the rate noted above, and at a temperature in a range from about 375° F. to about 380° F. The laminate 18 is formed at the pressing rolls 32, 34, when the hot-melt adhesive has cooled to a temperature (at which it remains capable of bonding) in a range from about 185° F. to about 195° F. Thus, when the hot-melt adhesive contacts the top sheet 12, the thermally sensitive material, Appleton's Thermal Coating No. T21022A, precoating the precoated surface 20 does not darken, i.e., the temperature at the precoated surface remains sufficiently low so that the thermally sensitive material remains below the activation temperature.

If the adhesive temperature at the time of combining of the sheets is such that the thermally sensitive material tends to be activated, then it will be desirable to cool the precoated surface and sheet, as by means of chilling. In that event roll 24 may be chilled as described above.

Various modifications may be made to the improved method disclosed herein without departing from the scope and spirit of this invention.

I claim:

1. A continuous method of making individual, laminated, thermally imageable baggage tags, the method comprising the steps of
   (a) providing an continuously feeding lengthwise a top sheet of indeterminate length, a plurality of reinforcing fibers of indetermiate length, and a bottom sheet of indeterminate length which is softer and less dense than the top sheet, the top sheet having a first surface and a second surface and being precoated on the first surface with a thermally sensitive material characterized by an activation temperature, at which the thermally sensitive material begins to darken,
   (b) applying a hot-melt adhesive in a molten condition to the bottom sheet, while the bottom sheet is being fed lengthwise, the hot-melt adhesive being applied at a temperature above the activation temperature,
   (c) chilling the coated surface of the top sheet prior to permitting the hot-melt adhesive to contact the second surface of the top sheet, and
   (d) pressing the top sheet, the reinforcing fibers, and the bottom sheet together so that the precoated surface remains exposed and remains free from contact with the hot-melt adhesive and so that the hot-melt adhesive is caused to contact the second surface of the top sheet while the hot-melt adhesive remains capable of bonding and remains at a temperature above the activation temperature, so as to form a continuous laminate from the top sheet, the reinforcing fibers, and the bottom sheet with the reinforcing fibers between the top and bottom sheets, wherein steps (b), (c) and (d) are practiced under conditions insuring that the temperature of the hot-melt adhesive contacting the second surface of the top sheet is sufficiently low to avoid heating the thermally sensitive material on the first surface of the top sheet to the activation temperature by heat transfer from the hot-melt adhesive, through the top sheet, to the thermally sensitive material.

2. The method of claim 1 wherein the coated surface of the top sheet is chilled by means of a chilling roll engaging the coated surface of the top sheet.

3. The method of claim 1 wherein step (c) includes pressing the top sheet, the reinforcing fibers, and the bottom sheet together by means of two pressing rolls defining a nip, through which the top sheet, the reinforcing fibers, and the bottom sheet are fed lengthwise so as to form the laminate.

4. The method of claim 3 wherein the pressing rolls include a relatively hard roll engaging the top sheet and a relatively soft roll engaging the bottom sheet.

5. The method of claim 2 wherein step (c) includes pressing the top sheet, the reinforcing fibers, and the bottom sheet together by means of two pressing rolls defining a nip, through Which the top sheet, the reinforcing fibers, and the bottom sheet are fed lengthwise so as to form the laminate.

6. The method of claim 5 wherein the pressing rolls include a relatively hard roll engaging the top sheet and a relatively soft roll engaging the bottom sheet.

7. The method of claim 1, and comprising the further step of severing the laminate so as to form individual baggage tags.

8. A continuous method of making individual, laminated, thermally imageable tags, the method comprising the steps of
   (a) providing and continuously feeding lengthwise a top sheet of intermediate length which is made from 20-pound bond paper, a plurality of reinforcing fibers of indeterminate length, and a bottom sheet of indeterminate length which is made of kraft paper and which is softer and less dense than the top sheet, the top sheet having a first surface and a second surface and being precoated on the first surface with a thermally sensitive material characterized by an activation temperature in a range from about 145° F. to about 150° F., at which the thermally sensitive material begins to darken,
   (b) applying a hot-melt adhesive in a molten condition to the bottom sheet, while the bottom sheet is being fed lengthwise, the hot-melt adhesive remaining capable of bonding at a temperature about 185° F., and (c) pressing the top sheet, the reinforcing fibers, and the bottom sheet together so that the precoated surface remains exposed and remains free from contact with the hot-melt adhesive and so that the hot-melt adhesive is caused to contact the second surface of the top sheet, while the hot-melt adhesive remains at a temperature above about 185° F. and the thermally sensitive material is maintained at a temperature below its activation temperature of about 145° F. to about 150° F., so as to form a continuous laminate from the top sheet, the reinforcing fibers, and the bottom sheet with the reinforcing fibers between the top and bottom sheets.

9. The method of claim 8 wherein the hot-melt adhesive consists essentially of amorphous polypropylene, which is applied in step (b) at a temperature of at least about 375° F.

10. The method of claim 8 wherein step (c) includes pressing the top sheet, the reinforcing fibers, and the bottom sheet together by means of two pressing rolls defining a nip, through which the top sheet, the reinforcing fibers, and the bottom sheet are fed lengthwise to form the laminate.

11. The method of claim 10 wherein the pressing rolls include a relatively hard roll engaging the top sheet and a relatively soft roll engaging the bottom sheet.

12. The method of claim 8, and comprising the further step of severing the laminate so as to form individual baggage tags.

13. The method of claim 8, and comprising the step of chilling the coated surface of the top sheet prior to causing the hot-melt adhesive to contact the second surface of the top sheet.

14. The method of claim 13 wherein the coated surface of the top sheet is chilled by means of a chilling roll engaging the coated surface of the top sheet.

* * * * *

UNITED STATES PATENT AND TRADEMARK OFFICE
CERTIFICATE OF CORRECTION

PATENT NO. : 5,092,949
DATED : March 3, 1992
INVENTOR(S) : Eric Goncalves

It is certified that error appears in the above-identified patent and that said Letters Patent is hereby corrected as shown below:

Column 1, line 60, "to" should be --top--;

Column 3, line 26, "James Riverx TM" should be --James River™--;

Column 5, line 57, "an" should be --and--; and

Column 5, line 59, "indetermiate" should be --indeterminate--.

Signed and Sealed this

Fourth Day of May, 1993

Attest:

MICHAEL K. KIRK

*Attesting Officer*  *Acting Commissioner of Patents and Trademarks*